United States Patent [19]

Grieco

[11] 3,861,088

[45] Jan. 21, 1975

[54] FIXTURE FOR SUPPORTING A TOOL SUBJECT TO GRINDING INCLUDING ACCURATELY POSITIONABLE TILTING ANGLE PLATE

[76] Inventor: Rocco F. Brieco, 14 Wittkop Pl., Millburn, N.J. 07041

[22] Filed: Mar. 14, 1974

[21] Appl. No.: 451,063

[52] U.S. Cl............... 51/216 A, 51/220, 51/218 A, 51/239
[51] Int. Cl............................................ B24b 41/06
[58] Field of Search....... 51/216 A, 216 H, DIG. 31, 51/220, 218 A, 239; 33/174 S, 174 TC

[56] References Cited
UNITED STATES PATENTS

| 1,308,451 | 7/1919 | Schachat | 51/DIG. 31 |
| 2,539,597 | 1/1951 | Staples | 33/174 TC |
| 3,512,309 | 5/1970 | Grieco | 51/218 R |

OTHER PUBLICATIONS

NASA SP 5926(01) Technology Utilization–Measurement Technology, Pages 10 and 11, 6/30/71.

*Primary Examiner*—Al Lawrence Smith
*Assistant Examiner*—Marc R. Davidson
*Attorney, Agent, or Firm*—Lerner, David, Littenberg & Samuel

[57] ABSTRACT

A fixture for supporting a tool subject to grinding, which fixture includes a base and a tilting angle plate pivotally secured thereto. Cylindrical extensions are placed at fixed points equidistant from the pivot point on the tilting plate and base, said cylindrical extensions meeting when the tilting angular plate is horizontal, and support means for supporting precision spacers positionable between the cylindrical extensions to give accurate measurements of the angular relationship between the tilting angle plate and the base.

2 Claims, 2 Drawing Figures

FIXTURE FOR SUPPORTING A TOOL SUBJECT TO GRINDING INCLUDING ACCURATELY POSITIONABLE TILTING ANGLE PLATE

BACKGROUND OF THE INVENTION

As is shown in my previously issued U.S. Pat. No. 3,512,309, in the past there has been shown a fixture for supporting a tool subject to grinding having a base and a carrier block joined at the base by knuckle members with a scale provided on the knuckle member for providing an indication of the angle of the carrier block with respect to the base. However, this marker, as noted in said patent, was often difficult to accurately read and, accordingly, in said U.S. patent there was described the utilization of measuring pins equidistant from the pivot axis of the knuckle, so that if one wished to measure the angle between the carrier block and the base accurately, it was necessary to place a micrometer between the pins, take a linear measurement, and then convert the linear measurement on a suitable scale, trigonometrically, into the angle containing the carrier block and the base. However, this meant accurately positioning the micrometer, adjusting the same, and determining the fixed angular distance between the pins when the angle plate was at a zero angle to the base plate. This fixed angular difference which was significant, approximately 17° in the embodiment shown in said patent made it difficult to measure a large angle, such as, for example, when the tilt plate was approximately 90° to the base plate. Here one dealt in an angle greater than 90° (i.e., 107°) and it was difficult to set predetermined angular positions between the angle plate and the base.

SUMMARY OF THE INVENTION

The invention relates to a device which overcomes the foregoing difficulties by providing a tilting angle plate wherein the measuring pins are replaced by cylindrical rolls whose diameters are such that when the angle plate is horizontal and, accordingly, the angle between the angle plate and the base plate is zero, the cylindrical measuring rolls are touching. A suitable spacer support means is provided removably positioned about the measuring rolls and provided with a guide slot to allow the measuring rolls to be separated by movement of the tilting angle plate with respect to the base plate. In this manner, precision spacers can be placed between the measuring rolls and thus it is only necessary to place the precision spacer having a predetermined thickness between the measuring rolls. The thickness of the measuring rolls thus adds to the chord of the angle between the center point of the measuring blocks in a manner which can be simply converted on a suitable scale to accurately set up the angle between the angle plate and the base plate. Utilizing this system, it is only necessary to take a precision block, corresponding to a particular desired angle between the angle plate and the base, placing it between the measuring blocks, bringing the measuring blocks into fixed contact with the spacer, and locking the angle plate in place to set an extremely accurate angle between the angle plate and the base. Since precision blocks are ordinarily available in a machine shop, it is simple for the machinist to set his desired angle by merely placing the block in position, and tightening the pivotal connection between the tilting angle plate and the base plate.

DETAILED DESCRIPTION OF THE INVENTION

The present invention may be embodied in other specific forms without departing from the spirit or essential attributes thereof and, accordingly, reference should be made to the appended claims rather than to the foregoing specification as indicating the scope of the invention.

Figure 1:
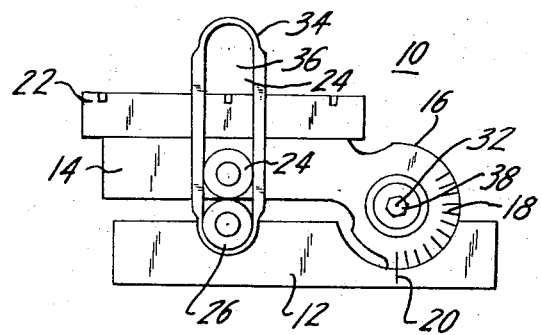
FIG. 1 is a side elevational view of the fixture of the present invention in the position or in the angle between the angle plate and the base plate is zero.
Figure 2:
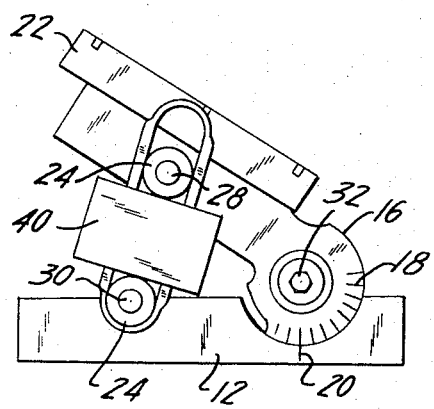
FIG. 2 is a side elevational view of the fixture of the present invention when a spacer is used to set a predetermined angle between the angle plate and the base plate.

In FIG. 1, there is shown a fixture 10 built in accordance with the principles of the present invention and similar to the fixture shown in FIG. 15 of U.S. Pat. No. 3,512,309, the disclosure of which is incorporated by reference in the specification. The fixture 10 has a base 12 and angle plate 14 which is joined to the base 12 by knuckle members 16. Although there is a scale 18 on the knuckle member 16, with a marker 20 on the base 12, it is often difficult to obtain accurate measurements as to the angle of the angle plate 14 with respect to the base 12. The angle plate 14 supports a carrier block 22 on which is mounted (although not shown) means for holding tools still for grinding the same. In order to accurately determine the angle of the carrier block 22 with respect to the base 12, there are provided a pair of measuring rolls 24 and 26. Each of these measuring rolls 24 and 26 is of a fixed diameter and has a center point 28 and 30, respectively. The center points 28 and 30 are equidistant from the axis 32 of the knuckle 16. The diameter of the measuring rolls 24 and 26 are set so that when the angle plate 14 is in the position shown in FIG. 1, i.e., where there is a zero angle between the angle plate 14 or carrier plate 22 and the base 12, the mesuring rolls 24 and 26 touch. A removable slotted block supporting means 34 is provided. The block supporting means 34 is ordinarily made of a flexible plastic material and is provided with a guide slot 36 whose width is equal to the outer diameter of the measuring rolls 24 and 26. It should be noted that it will also be possible to provide the measuring rolls 24 and 26 with an angular groove therein, with the block supporting member 34 having its slot 36 a width equal to the inner diameter of said angular slots so as to ride therein. The slot 36 has a length sufficient to allow complete angular movement of the tilting plate 14 with respect to the base plate 12.

The tilting plate 14 is fixed in its angular position by tightening Allen recess 38. Other means for fixing the angle plate 14 with respect to the base plate 12 may be used.

It can be seen that, at the position shown in FIG. 1, there is a fixed angular difference between the axes 28 and 30 of the measuring rolls 24 and 26. As the angle plate 14 is moved relative to the base plate 12, it can be seen that the angle between the center points 28 and 30 of the measuring rolls 24 and 26 with respect to the pivot 32 can be measured by measuring a chord or the exact distance between the points 28 and 30. Further, looking at it from the opposite point of view, if one desires a particular angle between the tilt angle plate 14 and the base 12, one wishes to obtain a particular chord. Since the angle measured by the chord between points 28 and 30 is equal to the desired angle plus the fixed angle when the measuring rolls are at the position shown in FIG. 1, it is only necessary to effect a predetermined chord to achieve a predetermined angle. Since the diameters of the two measuring rolls are fixed (said measuring rolls being made of hard steel precision ground), it is only necessary to place a precision spacer block 40 into position between the measuring rolls 24 and 26 and resting against the block positioning member 34 and bringing the tilting angle block 14 down so that the spacer 40 is held fixedly in position until the angle plate 14 can be secured in this angle position by a suitable wrench fitted into the Allen recess 38.

In most machine shops, there are available sets of spacers which vary in size so as to achieve precision measurements. These spacers are made of hard steel and, the use of said spacers with a suitable scale enable the machinist, utilizing the present invention, to accurately position his fixture at any predetermined angle with an accuracy which could not heretofore be achieved with prior art devices without resort to substantially more complex instrumentation and measurement. Thus, if one wished to achieve a particular angle, he need merely select the spacer for said angle, place it against the spacer support 34 between the measuring rolls 24 and 26, bring the measuring rolls 24 and 26 together until they touch on both edges of the spacer, and lock the tilting angle plate 14 into position. Thereafter, both the spacer 40 and the support 34 could be removed while the fixture is being utilized for the grinding of tool steel mounted on the carrier block 22.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

What is claimed is:

1. A fixture for supporting tool steel to be ground comprising
   a. a base plate;
   b. a tilting angle plate pivotally secured along an axis at one end thereof to said base plate;
   c. locking means for locking said angle plate to said base plate in a fixed angular position;
   d. tool-holding means secured to said angle plate;
   e. a pair of cylindrical measuring rolls secured respectively to said base and angle plates equidistant from said axis, said measuring rolls touching each other when the angle between said angle plate and said base plate is zero, and
   f. spacer support means, said spacer support means comprising a slotted guide member positioned wherein said measuring rolls fit within a longitudinal slot in said spacer support means, said slotted guide member providing support for spacer blocks placed between said measuring rolls.

2. A fixture for supporting tool steel to be ground of claim 1 wherein said measuring rolls are manufactured of hard tool steel and said spacer support member is flexible and removable from said measuring rolls.

* * * * *

UNITED STATES PATENT OFFICE
CERTIFICATE OF CORRECTION

Patent No. 3,861,088　　　　　　　　　Dated January 21, 1975

Inventor(s) ROCCO F. GRIECO

It is certified that error appears in the above-identified patent and that said Letters Patent are hereby corrected as shown below:

On the title page, the name of the Inventor should read: ROCCO F. GRIECO.

Column 2, Line 39, "mesuring" should read: - measuring - .

Signed and sealed this 1st day of April 1975.

(SEAL)
Attest:

RUTH C. MASON
Attesting Officer

C. MARSHALL DANN
Commissioner of Patents
and Trademarks